(12) United States Patent
Funk

(10) Patent No.: US 6,387,424 B2
(45) Date of Patent: May 14, 2002

(54) CONDUCTANCE BASED CONTROL SYSTEM AND METHOD

(75) Inventor: Robert C. Funk, Auburn, IL (US)

(73) Assignee: Bunn-O-Matic Corporation, Springfield, IL (US)

(*) Notice: Subject to any disclaimer, the term of this patent is extended or adjusted under 35 U.S.C. 154(b) by 0 days.

(21) Appl. No.: 09/740,213

(22) Filed: Dec. 18, 2000

Related U.S. Application Data

(60) Provisional application No. 60/172,495, filed on Dec. 17, 1999.

(51) Int. Cl.[7] ............................. A23L 2/00; A47J 31/00
(52) U.S. Cl. ......................... 426/231; 99/275; 99/283; 99/289 R; 99/323.3; 426/590
(58) Field of Search .............................. 426/231, 506, 426/590; 99/275, 283, 286, 289 R, 300, 323.3

(56) References Cited

U.S. PATENT DOCUMENTS

| | | | |
|---|---|---|---|
| 4,373,863 A | 2/1983 | Mason et al. ................. | 417/12 |
| 4,757,752 A | 7/1988 | Robins et al. ................ | 99/279 |
| 5,068,116 A | * 11/1991 | Gibney et al. .............. | 426/590 |
| 6,240,829 B1 | * 6/2001 | McGarrah ................... | 99/275 |

FOREIGN PATENT DOCUMENTS

WO WO 00/11914 3/2000

* cited by examiner

Primary Examiner—George C. Yeung
(74) Attorney, Agent, or Firm—Barnes & Thornburg

(57) ABSTRACT

The present invention relates to the system, apparatus, and method for controllably mixing a concentrate with a dilution substance using closed-loop feedback in order to improve the resultant substance. The present invention discloses a system, apparatus and method for sensing the conductivity of a diluted substance to provide feedback information for adjusting dispensing of a concentrate used to produce the resultant or diluted substance. The present invention also includes a system for dispensing beverages using the conductivity sensor such that the system controllably adjusts the dispensing of concentrate to maintain the resultant beverage within a desired concentration range based on conductivity sensing. The present invention also includes the method for sensing the conductivity of the resultant beverage and adjusting the dispensing of concentrate in response to the conductivity of the resultant beverage. The invention includes a conductivity sensor coupled to a dispensing portion downstream of the introduction of concentrate into the dilution liquid. The conductivity of the resultant mixed beverage is measured and the dispensing of the coffee concentrate is adjusted to maintain the resultant beverage within a desired conductivity range.

19 Claims, 3 Drawing Sheets

CONDUCTANCE BASED CONTROL SYSTEM AND METHOD

CROSS-REFERENCE

This application claims priority under 35 U.S.C. 119(e) to U.S. Provisional Application Serial No. 60/172,495 filed Dec. 17, 1999 which is expressly incorporated herein by reference.

BACKGROUND

The present invention relates to a novel system for controlling the mixture of concentrate with a dilution substance in a beverage preparation system. The invention also includes the method and apparatus of the system which achieves the control of the mixing of concentrate in a beverage preparation system.

By way of review, there are numerous beverage preparation systems which use a concentrate substance to prepare a beverage. Typically, the concentrate substance is diluted with another substance to prepare the desired resultant beverage. More specifically, there are coffee and juice concentrate systems which use a prepared coffee or juice concentrate. We will refer to coffee for the present discussion with the understanding that other beverages, such as juice, are included in the discussion. The coffee concentrate might be provided in a liquid form either at room temperature or, for example, in a frozen state. The packaged concentrate in this form might be referred to as a "bag-in-box" packaged concentrate, and the system dispensing such concentrate might be referred to as a "bag-in-box" system. In such a system, a concentrate retained in a container is connected to a system which dilutes the concentrate with a predetermined quantity of water. Typically, when making coffee, these systems use heated water so as to produce a heated coffee beverage. Such systems meter out a predetermined quantity of the concentrate to be mixed with the predetermined quantity of dilution water.

Such prior art systems also extend to powdered or solid beverage concentrate systems. In this regard, powdered beverage substances such as coffee, juices or other beverages can be diluted either to produce a single cup serving, larger volumes, or to refill a common supply tank. In these systems, the powdered beverage substance is mixed with the dilution water and dispensed into the corresponding container. In such systems, a predetermined volume, weight or quantity of powder is dispensed and mixes the material with a predetermined quantity of water. The dilution system of the prior art can extend to systems which utilize a freshly brewed concentrate such as taught in U.S. Pat. No. 4,757,752 to Robins et al. In the Robins' device, a tea concentrate is brewed and retained at a desired temperature range. The tea concentrate is then diluted on demand. In the system of Robins, the concentrate is diluted based on volume settings.

It is expected that there are other beverage and substance dispensing and diluting systems which are similar to or identical to that as described hereinabove. It is also believed that many of these systems would greatly benefit from the present invention which provides improved accuracy, consistency, repeatably, and uniformity as provided by the present invention.

OBJECTS AND SUMMARY

The present invention relates to the system, apparatus, and method for controllably mixing a concentrate with a dilution substance using closed-loop feedback in order to improve the resultant substance.

More specifically, the objective of the present invention is for use in combination with a concentrate based beverage dispensing system which monitors the conductivity of the diluted substance and provides feedback to adjust the dispensing of the concentrate.

Another object of the present invention is to provide a system for dispensing beverages which uses closed-loop feedback based on the conductivity of the diluted beverage to adjust the dispensing of concentrate.

Still a further object of the present invention is to provide a method of mixing a beverage concentrate with a dilution substance to produce a resultant beverage in which the conductance of the beverage is monitored for adjusting the dispensing of concentrate.

Briefly, and in accordance with the foregoing, the present invention discloses a system, apparatus and method for sensing the conductivity of a diluted substance to provide feedback information for adjusting dispensing of a concentrate used to produce the resultant or diluted substance. The present invention also includes a system for dispensing beverages using the conductivity sensor such that the system controllably adjusts the dispensing of concentrate to maintain the resultant beverage within a desired concentration range based on conductivity sensing. The present invention also includes the method for sensing the conductivity of the resultant beverage and adjusting the dispensing of concentrate in response to the conductivity of the resultant beverage. The invention includes a conductivity sensor coupled to a dispensing portion downstream of the introduction of concentrate into the dilution liquid. The conductivity of the resultant mixed beverage is measured and the dispensing of the coffee concentrate is adjusted to maintain the resultant beverage within a desired conductivity range.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION

Figure 1:
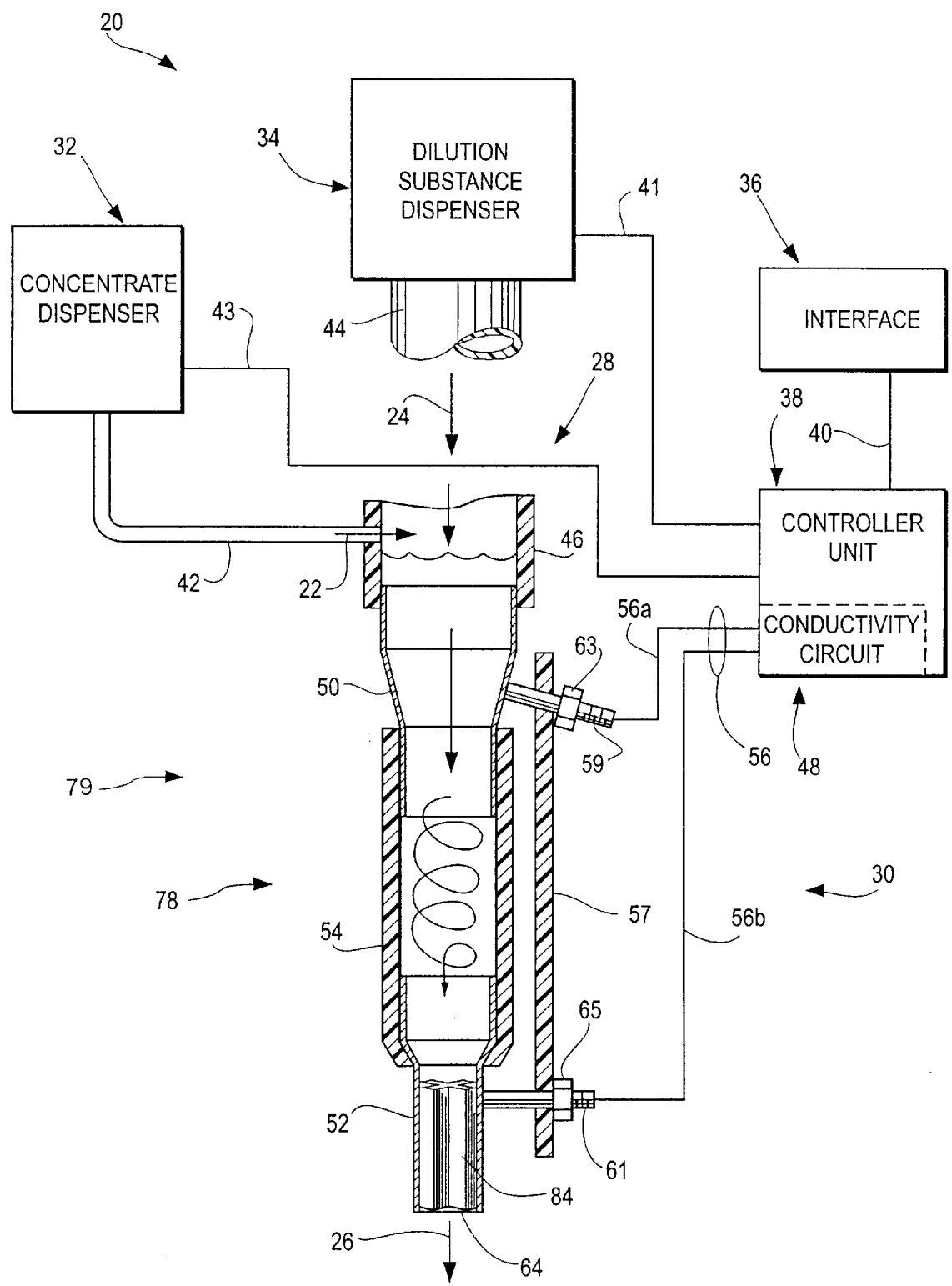
FIG. 1 is a diagrammatic illustration of the conductivity sensor and system which incorporates the features of the invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention provides a novel system, apparatus and method 20 for controllably combining a concentrate substance 22 with a dilution substance 24 such as heated water to produce a resultant beverage 26. With reference to FIG. 1, the system 20 is shown diagrammatically and includes a novel dilution assembly 28 using a novel conductance sensor 30. The dilution assembly 28 is coupled to a concentrate dispenser 32 and a dilution substance dispenser 34. In a preferred embodiment the concentrate dispensers 32 dispense a liquid or solid concentrate, as well as any other form of concentrate which might be applicable in the preparation of food substances.

While concentrate is referred to in this application, it is envisioned that other substances may be used and the present invention broadly includes such other substances, variations, alternates, equivalents, substitutes, and/or combinations. For example, for food substances such as soups, a base may be used and reconstituted with water. In this example, while the base may or may not be concentrated, it is combined with water to produce the resultant soup. Similarly, the invention may be used to prepare substances which are concentrated in order to prepare the substance in a more useful form. For example, a chocolate powder may be prepared using the invention to produce a liquid chocolate concentrate in a concentration which may be preferable for mixing with other substances such as coffee. In this regard the liquid chocolate may be used to mix with coffee and avoid potential powder mixing problems such as clumping.

With the foregoing in mind, the description is generally directed to the preparation of a beverage and specifically described as the preparation of coffee. However, it should be appreciated that other foods might also be prepared using this system and its structures and such systems are fully included within the scope of the present invention. Moreover, description in the present application is directed to a diluted substance dispenser 34 which uses hot water. However, it should be appreciated that other liquid substances may be used to dilute or mix with the concentrate such as coffee, tea, carbonated water, milk products, or other substances. Additionally, the present application also includes other devices which may be used to combine the concentrate 22 and the dilution substance 24. For example, mechanical agitators, heaters, or coolers should be fully considered as contemplated in the present invention.

With reference to FIG. 1, an interface 36 is provided in the system 20. The interface 36 may be as uncomplicated as on/off switches or controls or may involve detailed computer based user-interface selections. Such user-interface selections may involve the user inputting specific criteria about the desired resultant food substance, may involve a memory or recognition device which associates information regarding the user and the food substance or a combination of such devices. Regardless of its degree of complexity, the interface 36 is coupled to a controller 38 which controls the system in response to inputs from the interface 36. The controller 38 is coupled to the dilution substance dispenser 34, concentrate dispenser 32, and the conductance sensor 30. When the user-interface 36 is activated, a signal is transmitted via line 40 to the controller 38. The controller 38 then responds to the signal 40 and controllably operates the dilution substance dispenser 34 (via line 41) and concentrate dispenser 32 (via line 43) to dispense a pre-determined quantity of dilution substance 24 and concentrate 22 into the dilution assembly 28.

One of ordinary skill in the art will appreciate that appropriate connections, couplings or conduits (42, 44) are provided to permit the dispensers 34, 32 to communicate with a corresponding chamber 46 of the dilution assembly 28. The concentrate 22 and dilution substance 24 are mixed in the chamber 46 to produce a desired resultant beverage 26.

The conductance sensor 30 is coupled to the chamber, generally positioned at least slightly downstream from the initial mixing of the concentrate 22 and the dilution substance 24. The conductance sensor 30 is positioned downstream in order to allow at least some mixing of the concentrate 22 and the dilution substance 24 before it is monitored for conductivity. The conductance sensor 30 includes a conductivity sensing circuit 48 which includes two at least slightly spaced-apart contacts or probes in the form of a first 50 and second 52 generally cylindrical electrodes. The electrodes 50, 52 are spaced apart by a non-conductive or dielectric portion 54 such as a silicone tube. The conductivity sensing circuit 48 is coupled to the associated sensing circuit 48 of the controller 38 by line 56. As shown in FIG. 1, a spacer 57 of a dielectric material is provided to space apart the electrodes 50, 52. Conductive threaded studs 59, 61 are provided on the electrodes 50, 52 and are attached to the spacer 57 with nuts 63, 65. Lines 56a, 56b are attached to the conductive studs 59, 61. It should be noted that the electrodes 50, 52 may be in any of a variety of suitable forms and are not limited to the generally cylindrical electrode configuration as illustrated. The electrodes may be in the form of probes extending into the stream or areas contacted by some portion of the stream such as a conductive area on the inside of the structure containing the stream.

Continuing the dispensing of a resultant beverage as initially discussed above, the conductivity sensing circuit 48 provides conductance measurements 56 of the resultant beverage during the dispensing of the desired quantity of beverage. In this regard, the conductance of the resultant beverage can be used to adjust the dispensing of the concentrate 22 and the dilution substance 24 from the corresponding dispensers (32, 34) to maintain the conductance of the resultant beverage 26 within a desired range. The signal 56 is processed by the controller 38 which then makes adjustments to the dispensing from the dispensers 34, 32 throughout the beverage production cycle. The adjustment of the concentrate dispensing throughout the beverage dispensing cycle helps to increase the consistency, repeatability, uniformity and accuracy of the concentration of the concentrate in the dilution substance.

In contrast, prior art devices typically dispense a volume or time-metered quantity of concentrate and dilution substance. If there were some deviation in either of these substances from some standard level or range of acceptable levels, the resultant beverage would be outside of the desired acceptable level. Moreover, if the tolerances of acceptable levels of dilution substance of concentrate became cumulative, such that independently each component was within its desired range but cumulatively the combination was outside the desired range, there would be an effect on the resultant beverage. The effect on the resultant beverage would be manifested in the form of changes in the flavor characteristics and flavor profile. The change in these characteristics results from increased characteristic components in the concentrate as well as the dilution substance. This closed-loop system shows improved performance compared to prior art, from the standpoint of the limitations of prior "open-loop" systems that merely dispense for a fixed period of time from the concentrate and dilution (hot water) channels. Such prior art systems yield varying finished-beverage results when: the viscosity of the concentrate is high and variable enough that flow rate through the pumping means cannot be precisely predicted from run-time alone; the dilution channel flow is based on gravity flow from a reservoir with varying water level, thus varying flow rate; or the concentration of flavor components in the beverage concentrate is not consistent over time, thus a fixed volumetric dilution is not adequate to ensure consistent finished-beverage flavor.

While control of both substance dispensers 34, 32 may be achieved using the present system 20, precise control of the dilution substance dispenser 34 may not be necessary when only water is being dispensed to dilute a beverage concentrate 22 such as coffee concentrate. In this regard, a time-metered or volume-metered quantity of heated water may be dispensed from the dispenser 34 and adjustment to the conductivity of the resultant beverage 26 being controlled by controlling the concentrate dispenser 32. The closed-loop system of the present invention improves the consistency of the resultant beverage 26 by more accurately controlling the dispensing of concentrate 22 into the hot water stream 24. The conductance sensing circuit 48 and controller 38 calculate the conductance to determine the concentration of the resultant beverage 26 and provide controlled variation of the dispensing rate of the concentrate 22 into the blending chamber 46. This requires that the concentrate dispenser 32 is adjustably controllable.

While a variety of concentrate dispensers 32 might be employed in the present invention, the dispensing system as disclosed in U.S. patent application Ser. No. 09/602,908, filed Jun. 23, 1999 entitled Concentrate Pump System identifying Kevin G. Lowe and Robert C. Funk as inventors, provides a highly accurate controllable system which benefits from the conductance sensing of the present invention. The disclosure of this application is incorporated herein by reference in its entirety. The controller 38 is pre-programmed with information about the control of the dispenser 32 so that when a specific conductivity is sensed by the conductance sensor 30, if necessary, adjustment of the flow rate of the dispenser or pump 32 can be made in response thereto.

Figure 3:
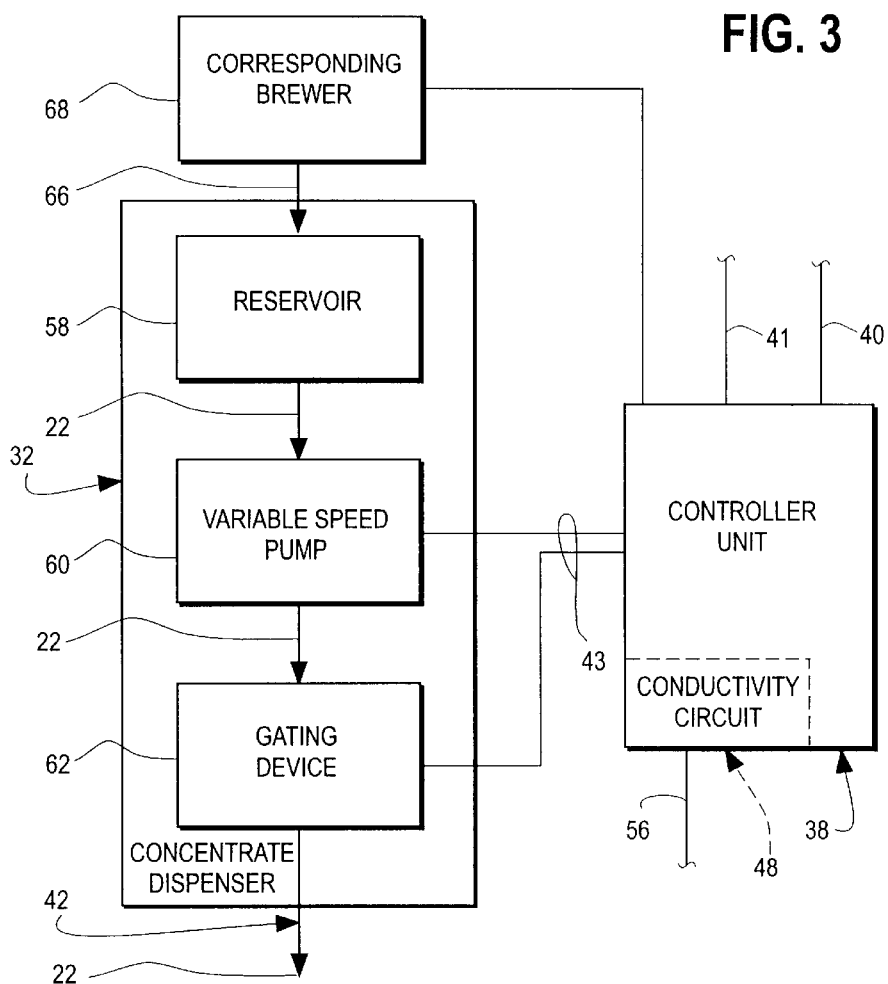
FIG. 3 is a diagrammatic illustration of an example of a concentrate system of the invention.

With reference to FIG. 3, a concentrate dispenser 32 is shown diagrammatically employing elements also disclosed in the above referenced application. The dispenser 32 includes a reservoir 58 coupled to a pump 60 coupled to a gating device 62. The pump 60, in a preferred embodiment, a peristaltic pump in accordance with the teachings of the above referenced application, draws concentrate from the reservoir 58. The concentrate is advanced from the pump 60 to the gating device 62. The gating device 62 is controllably operated to more precisely control the flow from the pump 60. As a result, with further reference to FIG. 1, a precise quantity of concentrate can be dispensed from the concentrate dispenser 32 through the conduit 42 communicating with the blending chamber 46. It should be noted that while some dispensing devices may require only one control line with the controller, two controlled signals may be required for the embodiment of the dispenser 32 as shown in FIG. 3. In this regard, independent control of the pump 60 and the gating device 62 may provide more accurate control of the dispenser 32.

The system monitors conductance of the concentrate "on the fly" and allows the adjusting of the variable speed pump 60 and the gating device 62 to precisely control the amount of concentrate injected into the dilution stream.

The present invention helps to adjust the system to assure consistent blend strength since the conductivity of the beverage is related to the blend strength. For example, the concentrate in combination with the dilution water 24 is measurably more conductive than the water prior to mixing with concentrate.

Another benefit of using the dispenser 32 as shown in FIG. 3 is that the gating device tends to reduce or eliminate the "pulsing" of liquid through the conduit 42 thereby providing a more uniform flow. This will increase the uniformity of the mixture with the heated water and dispensing of a consistent beverage from the exit port 64 of the dilution assembly 28. This reinforces and enhances the visual characteristics of the brewed beverage to the consumer.

The conductivity circuit 48 senses the conductance of various substances and can be adjusted for the type of substance being dispensed. The conductance reading or measurement is used as a characteristic of the concentrate in the resultant beverage 26. For example in coffee, the conductivity measurement is related to the caffeine, acid, and solids (total dissolved solids) in the coffee concentrate. Also, in juice products, the conductance measurement is related to the acids in the juice. Of course, the system can be adjusted based on the type of concentrate used in the characteristics of the concentrate. Generally, this system relies on the ionic molecules in the particular concentrate as conductors.

Additionally, a range of acceptable levels of conductance (concentrate) can be set for a particular type of beverage. The predetermined range and the variability of the concentrate injection into the dilution stream 24 helps accommodate variations in batches of concentrate regardless of whether the concentrate is in a prepared liquid form, fresh prepared liquid form, powdered form, or other form. While the variability of the substance used to prepare the concentrate may change from batch to batch or the processing techniques may vary slightly based on manufacturing tolerances of the concentrate, the adjustments resulting from the present system helps assure a consistent resultant beverage 26.

The present system 20 accommodates ranges for several variables. For example, the system can be adjusted to take into account the temperature of the substance. In this regard, conductivity is generally consistent at elevated temperatures whereas conductivity tends to be reduced with a decrease in temperature. A control can be provided on the controller unit 38 or the conductivity circuit 48 to adjust the range upwardly or downwardly. This may be used to adjust the system for regional tastes, for example, to make a batch of coffee stronger or weaker. However, the control may also be limited to a specific desired range while still providing adjustment within that range upwardly or downwardly. As an additional consideration, the circuit 48 senses AC conductance. AC conductance is used in order to prevent plating of the molecules on the electrodes 50, 52. Also, a triac is used to change energy to the solenoid to control the gating device 62 to control the flow therethrough.

The conductance sensor 30 can be used to sense an empty dispenser 32 condition. For example, if the sensor 30 senses a dramatic change in conductance, this would tend to indicate either the absence of concentrate or dilution liquid in the dispenser 32 or a blockage preventing concentrate 22 or dilution liquid from entering the blending chamber 46. In either situation, this condition can be identified to the user whereby troubleshooting can occur to solve the problem. Furthermore, in a highly automated system, the low or no concentrate signal sensed by the sensor 30 can be used to initiate a refill cycle whereby concentrate stock can be dispensed from a corresponding brewer 68 coupled to the controller 38. This might be in the very basic form as shown in the Robins et al. patent mentioned in the Background section of this application.

Figure 2:
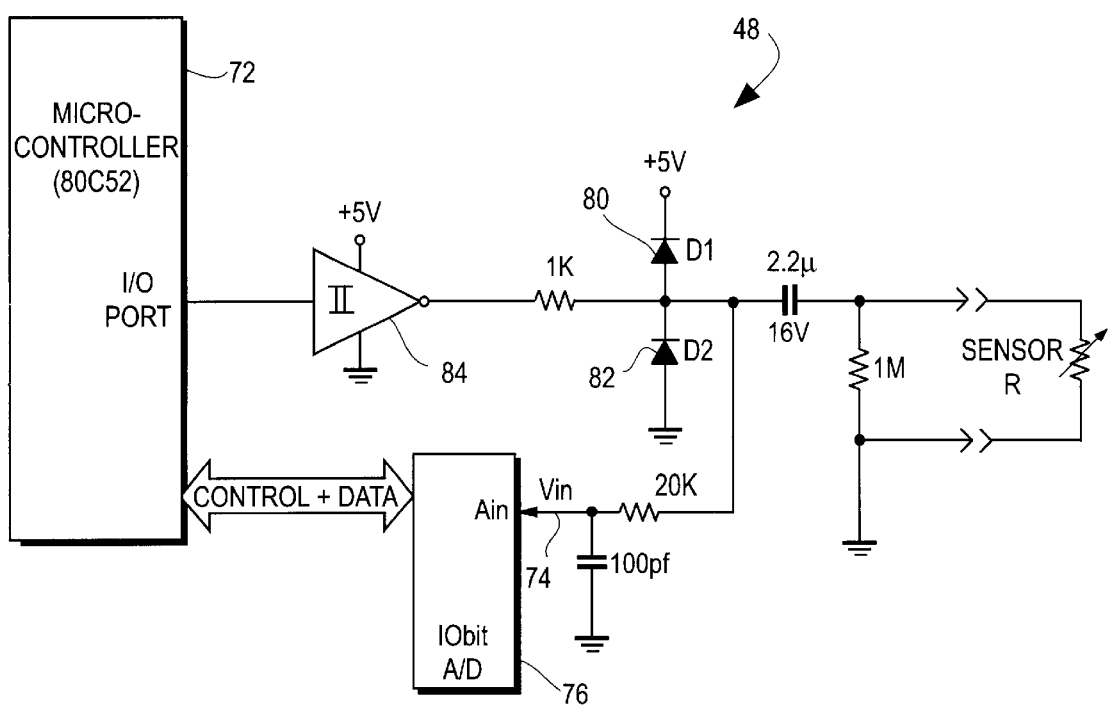
FIG. 2 is a schematic of a sensor circuit used to sense the conductivity of the resultant beverage.
Figure 4:
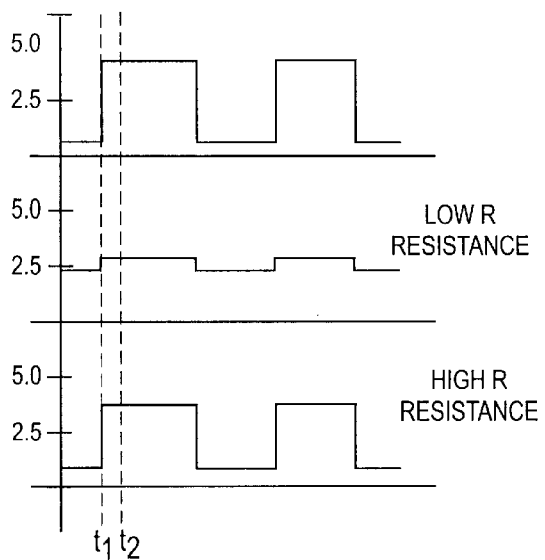
FIG. 4 is a chart of signal waveforms of conductance sensor operation.

With reference to the circuit of FIGS. 2 and 4, a portion of the sensing circuit 48 is shown. As generally shown, the micro controller 72 outputs a square wave which makes position transition at t1. The analog to digital input voltage 74 fed to the analog to digital converter 76 is read at t2. The conductance of the portion of the resultant beverage in the sensing chamber 78 at a given time interval is related to the analog to digital reading. The conductance is detected and the measurement is used in determining whether to accelerate or decelerate the variable speed pump and gating device 60,62 used in the dispenser 32. It should be noted that the average current is zero in order to eliminate buildup on the electrodes 50,52. The lower sensing electrode 52 is generally connected to circuit ground and earth ground such that any external surface contacted by the delivered beverage will not affect the conductance reading of the sensor. The effective parallel conductance of the concentrate line 42 is not significant due to its length and small cross-section; the effective parallel conductance of the water from line 44 is not significant due to the relatively low conductance of water. This is consistent with the use of AC in the system to prevent plating. It should also be noted that diodes 80,82 are provided to protect the gate 84 and input to the analog to digital converter. The schematic of FIG. 2 and examples of wave forms in FIG. 4 show how the microcontroller 72 and A/D converter can rapidly determine a conductance reading with no DC current through the sensor. The reading or measurement is used, for example, to determine the concentration of coffee components in a blended beverage.

The measured conductivity is based on the peak reading among several readings taken over an interval which includes individual A/D readings at consecutive "t2" events; this further ensures that the occasional air bubble will not introduce confusing control responses.

The control algorithm implements an integrating response with variable gain, such that the rate at which the concentrate dispenser's drive responds to a measured error in conductivity is set to not over-react to normal variations in measured conductivity, such as might occur with the introduction of an occasional air bubble into the sensing chamber.

The user can adjust the delivered beverage strength with a simple control (e.g. rotary control knob) connected to the controller which adjusts the target to which the closed-loop control adjusts average conductance readings.

Turning now to FIG. 1, a mixing chamber 79 includes the blending chamber 46 and the sensing chamber 78. The mixing chamber 79 communicates with the controllable concentrate dispenser 32 and the controllable dilution substance dispenser 34. The conductance sensor 30 is operatively associated with the mixing chamber 79. The dilution assembly 28 includes conductance sensor 30 which includes the generally cylindrical electrodes 50, 52. The electrodes are also formed in a reduced diameter or necked-shape so as to generate a degree of mixing turbulence in the blending chamber 46 as the hot water 24 and concentrate 42 are injected therein. The tapered section 50 tends to inhibit the introduction of air bubbles into the sensing chamber between 50 and 52, which would have confounded the accurate sensing of the conductance of the blended liquid beverage. The turbulence restricts the outflow of the blended beverage through the exit port 64. This produces a degree of buildup in the blending chamber 46. The mixing and blending of the concentrate with the water helps assure that it is thoroughly mixed. This is important for an accurate reading for insuring that the sensing chamber 78 is full of liquid when sensing conductivity and that the concentrate and water are thoroughly mixed together to prevent striation or layering. A partially full conductivity chamber might result in an inaccurate reading as well as striation creating inconsistent reading. The controller 38 is programmed with a brief delay (for example, one second) when the dispensing cycle is initiated. The brief delay insures that the sensing chamber 78 is full of liquid before measurements are taken. This helps to assure that the system does not overreact to the initial, perhaps inconsistent, mixture of beverage which is used to fill the sensing chamber 78.

With further reference to FIG. 1, a columnating device 84 is provided in the electrode 52 proximate to the exit port 64. The columnating device 84 helps to reduce the swirling and turbulence which might otherwise be present at the exit port 64. By columnating and directing the flow in a generally vertical direction, the potential for splashing at the exit port 64 is minimized or prevented. The columnating device 84 as shown in FIG. 1 is generally multi-vaned device. It should be noted that a single blade device such as in taught in U.S. Pat. No. 5,423,245 issued Jun. 13, 1995 could be used for this purpose as well.

Near the completion of the dispensing cycle, dispensing of the concentrate is ceased and a small quantity of water is used to rinse the dilution assembly 28. By rinsing at the end of the dilution cycle, the dilution assembly 28 can be kept clean and sanitary thereby further improving the efficiency of the invention. Such cleaning also helps maintain the accuracy of the system by keeping the electrode surfaces clean at the end of a mixing cycle.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

What is claimed is:

1. A system for sensing conductivity of a mixed food substance to controllably dispense at least one of a concentrate and a dilution substance mixed by said system to produce said mixed food substance, said system comprising:

a controllable concentrate dispenser for controllably dispensing a food concentrate;

a controllable dilution substance dispenser for controllably dispensing a dilution substance for diluting said concentrate;

a mixing chamber communicating with said controllable concentrate dispenser and said controllable dilution substance dispenser for mixing said concentrate and said dilution substance to produce said mixed food substance;

a user-interface;

a conductance sensor operatively associated with said mixing chamber for detecting the conductivity of said mixed food substance in said system prior to dispensing;

a controller coupled to said controllable concentrate dispenser, said controllable dilution substance dispenser, said user interface, and said conductance sensor, said controller using conductivity information from said conductance sensor to controllably operate at least one of said controllable concentrate dispenser and controllable dilution substance dispenser to maintain a conductance of said mixed food substance within a desired range, said user-interface allowing adjustment of said controller to define mixing parameters of said mixed food substance.

2. A device for use with a mixed food dispensing apparatus, said apparatus including a controllable concentrate dispenser for controllably dispensing a food concentrate, a controllable dilution substance dispenser for controllably dispensing a dilution substance for diluting said concentrate, and a mixing chamber communicating with said controllable concentrate dispenser and said controllable dilution substance dispenser for mixing said concentrate and said dilution substance to produce a mixed food substance, said device comprising:

a user-interface;

a conductance sensor cooperatively associated with said mixing chamber for detecting the conductivity of said mixed food substance in said device prior to dispensing from said mixed food dispensing apparatus;

a controller coupled to said controllable concentrate dispenser, said controllable dilution substance dispenser, said user interface, and said conductance sensor, said controller using conductivity information from said conductance sensor to controllably operate at least one of said controllable concentrate dispenser and controllable dilution substance dispenser to maintain a conductance of said mixed food substance within a desired range, said user-interface allowing adjustment of said controller to define mixing parameters of said mixed food substance.

3. A method for controlling the mixing of a mixed food substance mixed by a mixed food dispensing apparatus, said mixed food substance being formed from a concentrate and a dilution substance, said apparatus including a controllable concentrate dispenser for controllably dispensing a food concentrate, a controllable dilution substance dispenser for controllably dispensing a dilution substance for diluting said concentrate, a mixing chamber communicating with said controllable concentrate dispenser and said controllable dilution substance dispenser for mixing said concentrate and said dilution substance to produce said mixed food substance, a conductance sensor cooperatively associated with said mixing chamber for detecting the conductivity of said mixed food substance, a controller coupled to said controllable concentrate dispenser, said controllable dilution substance dispenser and said conductance sensor, said method comprising the steps of:

operating said controllable concentrate dispenser and said controllable dilution substance dispenser to dispense said concentrate and said dilution substance;

mixing said concentrate and said dilution substance in said mixing chamber to produce said mixed food substance;

sensing a conductance of said mixed food substance as said mixed food substance travels through said mixing chamber;

comparing said conductance of said mixed food substance to a desired conductance of said mixed food substance; and controllably operating at least one of said controllable concentrate dispenser and controllable dilution substance dispenser to adjust the conductance of said mixed food substance dispensed from said apparatus to a desired conductance.

4. The system of claim 1, wherein said mixing chamber including at least one tapered section for inhibiting the introduction of air bubbles into said mixing chamber.

5. The system of claim 1, said mixing chamber comprising:

a blending chamber communicating with said controllable concentrate dispenser and said controllable dilution substance dispenser; and a sensing chamber communicating with said blending chamber.

6. The system of claim 5, wherein said conductive sensor is operatively associated with said sensing chamber.

7. The system of claim 1, wherein said conductance sensor includes at least two spaced apart conductive contacts.

8. The system of claim 1, wherein said conductive sensor includes a non-conductive portion positioned between said at least two spaced apart conductive contacts.

9. The system of claim 1, wherein said system is a closed-loop system controlled by said controller.

10. The device for use with a mixed food dispensing apparatus as recited in claim 2, wherein said mixing chamber including at least one tapered section for inhibiting the introduction of air bubbles into said mixing chamber.

11. The device for use with a mixed food dispensing apparatus as recited in claim 2, said mixing chamber comprising:

a blending chamber communicating with said controllable concentrate dispenser and said controllable dilution substance dispenser; and a sensing chamber communicating with said blending chamber.

12. The device for use with a mixed food dispensing apparatus as recited in claim 11, wherein said conductive sensor is operatively associated with said sensing chamber.

13. The device for use with a mixed food dispensing apparatus as recited in claim 2, wherein said conductance sensor includes at least two spaced apart conductive contacts.

14. The device for use with a mixed food dispensing apparatus as recited in claim 2, wherein said conductive sensor includes a non-conductive portion positioned between said at least two spaced apart conductive contacts.

15. The device for use with a mixed food dispensing apparatus as recited in claim 2, wherein said device is a closed-loop system controlled by said controller.

16. The method of claim 3, further providing said mixing chamber with at least one tapered section, introducing said concentrate and said dilution substance into said mixing chamber, passing of said mixed food substance though said tapered section to inhibit the instruction of air bubbles into said mixing chamber.

17. The method of claim 3, said mixing chamber including a blending chamber communicating with said controllable concentrate dispenser and said controllable dilution substance dispenser, and a sensing chamber communicating with said blending chamber, said conductive sensor cooperatively associated with said sensing chamber; further comprising the steps of:

introducing said concentrate and said dilution substance into said blending chamber;

passing of said concentrate and said dilution substance to said sensing chamber; and sensing a conductance of said food substance in said sensing chamber.

18. The method of claim 3, wherein said conductance sensor includes a first conductive contact and a second conductive contact, said conductive contacts being spaced apart, further comprising the step of sensing a conductance at said first conductive contact and sensing a conductance at said second conductive contact.

19. The method of claim 3, wherein said conductance sensing of said mixed food substance and control of said concentrate dispenser and said controllable dilution substance dispenser is a closed-loop system controlled by said controller.

* * * * *